United States Patent [19]

Ezis et al.

[11] Patent Number: 4,489,032
[45] Date of Patent: Dec. 18, 1984

[54] METHOD OF HOT PRESSING REACTIVE MATERIALS

[75] Inventors: Andre Ezis, Grosse Ile; Warren B. Copple, Dearborn Heights, both of Mich.

[73] Assignee: Ford Motor Company, Dearborn, Mich.

[21] Appl. No.: 444,902

[22] PCT Filed: Sep. 30, 1982

[86] PCT No.: PCT/US82/01370
§ 371 Date: Sep. 30, 1982
§ 102(e) Date: Sep. 30, 1982

[87] PCT Pub. No.: WO84/01369
PCT Pub. Date: Apr. 12, 1984

[51] Int. Cl.³ ............................................. C03B 23/20
[52] U.S. Cl. ..................................... 264/325; 264/332
[58] Field of Search ........................ 264/332, 68, 325

[56] References Cited

U.S. PATENT DOCUMENTS 3,589,880 6/1971 Clark ..................................... 264/332
4,215,088 7/1980 Ardary ................................. 264/332

FOREIGN PATENT DOCUMENTS 2651311 5/1977 Fed. Rep. of Germany ...... 264/332
48-26927 8/1973 Japan ..................................... 264/332
1448732 9/1976 United Kingdom ................ 264/332

Primary Examiner—John A. Parrish
Attorney, Agent, or Firm—Joseph W. Malleck; Olin B. Johnson

[57] ABSTRACT

A method is disclosed for hot pressing agglomerated materials in a pressing assembly having walls which can be reactive with the material to be pressed under the environmental, temperature, and pressure conditions to be experienced by the material at the interface with the pressing assembly walls. After a plurality of generally flat stackable billets (10-20) of the powdered material are formed and stacked in a pressing assembly (21) in a predetermined aligned order, a barrier wall (30) is interposed between the interface of the billets and pressing assembly along at least a zone (26) in which a temperature of 1600°-1750° C. and a pressure of at least 3000 psi will be experienced at the interface during hot pressing. The billets are then hot pressed to a desirable density and removed, leaving the assembly walls in a substantially unreacted condition.

10 Claims, 2 Drawing Figures

METHOD OF HOT PRESSING REACTIVE MATERIALS

BACKGROUND OF THE INVENTION AND PRIOR ART STATEMENT

Hot pressing has typically been used to densify powder materials under pressure and heat, the pressure assembly typically being comprised of close fitting members constructed of carbon, preferably graphite. Pressure is applied to the movable parts of the assembly by hydraulic means, and heat is applied by placing the assembly in a heated environment, such as a furnace, which introduces heat by induction heating or resistance heating (see U.S. Pat. No. 3,455,682).

One of the most significant problems associated with hot pressing of certain ceramic crystalline powders is the tendency of the powder to react and adhere to the mold or container as a result of the ambient environment or conditions prevailing in the compacted powders and the high temperature and pressure applied through the pressing assembly in certain zones thereof. This results in damage to the assembly walls as well as to the surfaces of the molded body by the formation of a reaction layer. Particularly, when attempting to hot press silicon nitride, there is a tendency for a reaction to take place between the silicon nitride and carbon and carbon monoxide (the latter is released as a result of the high heat and available oxygen content of the graphite assembly) to form silicon carbide along with small quantities of free silicon and oxides of nitrogen and/or free nitrogen and oxides of carbon as well as oxides of silicon. Porosity in the $Si_3N_4$ is also produced. The silicon carbide reaction layer makes the use of the die walls unusable for subsequent hot pressing because it destroys the dimensional relationship as well as chemical inertness of the pressing assembly. In addition, SiC and other reaction products must be removed by diamond grinding from the $Si_3N_4$ end products, which is an expensive step.

The prior art has concerned itself with the reaction between metal casting vessels formed of graphite and molten silicon which has been inserted into such molds. The art has typically utilized alkali fluorides or silicates to coat the graphite and prevent an undesirable chemical reaction (see U.S. Pat. Nos. 4,234,630; 3,023,119; and 2,840,480).

The prior art has also utilized release agents as materials to facilitate separation and removal of the hot pressed silicon nitride from graphite assemblies after hot pressing. The release agents have typically been comprised of boron nitride or an anisotropic graphite of low density. The graphite is in an insertable form, such as foil, and possesses low permeability and an exceptionally low coefficient of friction. These materials, either as a coated slurry or as an insert sheet or foil, are generally placed on the contact surfaces of the graphite walls of the pressing assembly and also on the walls of the silicon nitride material if it happens to be a compacted body prior to being inserted in the pressing assembly. Unfortunately, such release agents are not effective and do not preclude the formation of silicon carbide between the interface of the silicon nitride body and the graphite walls, even though the boron nitride or graphite pieces are interposed therebetween. Thus, again, the graphite die assembly walls are unable to be reused in subsequent pressing operations (see U.S. Pat. Nos. 3,892,835 and 3,819,787 which are pertinent to the use of boron nitride, and see U.S. Pat. No. 4,113,830 pertinent to the use of an insertable graphite sheet).

SUMMARY OF THE INVENTION

This invention is a method of hot pressing agglomerated powder materials (and preferably partially consolidated billets) in a pressing assembly having walls reactive with the material to be pressed under the environmental, temperature, and pressure conditions to be experienced by the material at an interface with the pressing assembly walls.

The method comprises the preparation of a plurality of generally flat stackable billets of said material. The billets are stacked in a predetermined aligned order within the pressing assembly. A barrier wall is interposed between the interface of said billets and pressing assembly along at least a zone of said assembly in which a temperature of 1600°–1750° C. and a pressure of at least 1000 psi will be experienced at said interface during hot pressing. The barrier wall must be effective to prevent a chemical reaction between said billets and pressing assembly; preferably the barrier wall acts as a barrier to the transport of gaseous reaction products therethrough. Finally, the stacked billets within the assembly are subjected to hot pressing to achieve a desired density in each of said billets.

Preferably, the billets are comprised of silicon nitride, each having silicon nitride and oxygen carrying crystallites and containing up to 0.5% by weight of free silicon and unreacted oxides, and up to 2% by weight cation impurities, each billet having a density of at least 1.4 $gm/cm^3$. Preferably, the hot pressing is carried out for a period of 0.25–3 hours, at an ultimate pressing temperature of at least 1600° C. and a pressure of at least 3000 psi.

The hot pressing assembly has the walls advantageously comprised of graphite which can be of a medium or high quality formed either by extrusion or molding, each of the graphites being characterized by medium to extremely fine grain size, a density of at least 1.68 $gm/cm^3$, preferably 1.68–1.73 $gm/cm^3$, and a flextural strength with the grain of at least 2400 psi, preferably 2400–4010 psi.

The barrier wall is advantageously selected from the group of refractory metals consisting of molybdenum, tungsten, tantalum and niobium. The barrier wall is preferably in a thickness range of 0.001–0.004 inches in thickness, and is placed in the hot pressing assembly in contiguous contact with both the graphite walls (or graphite foil covering the walls) and the sides of the billets.

Preferably, each of the billets and the interior walls of the pressing assembly are coated with a release agent prior to hot pressing. The release agent may be comprised of a slurry of boron nitride or its equivalent.

DETAILED DESCRIPTION

Figure 1:
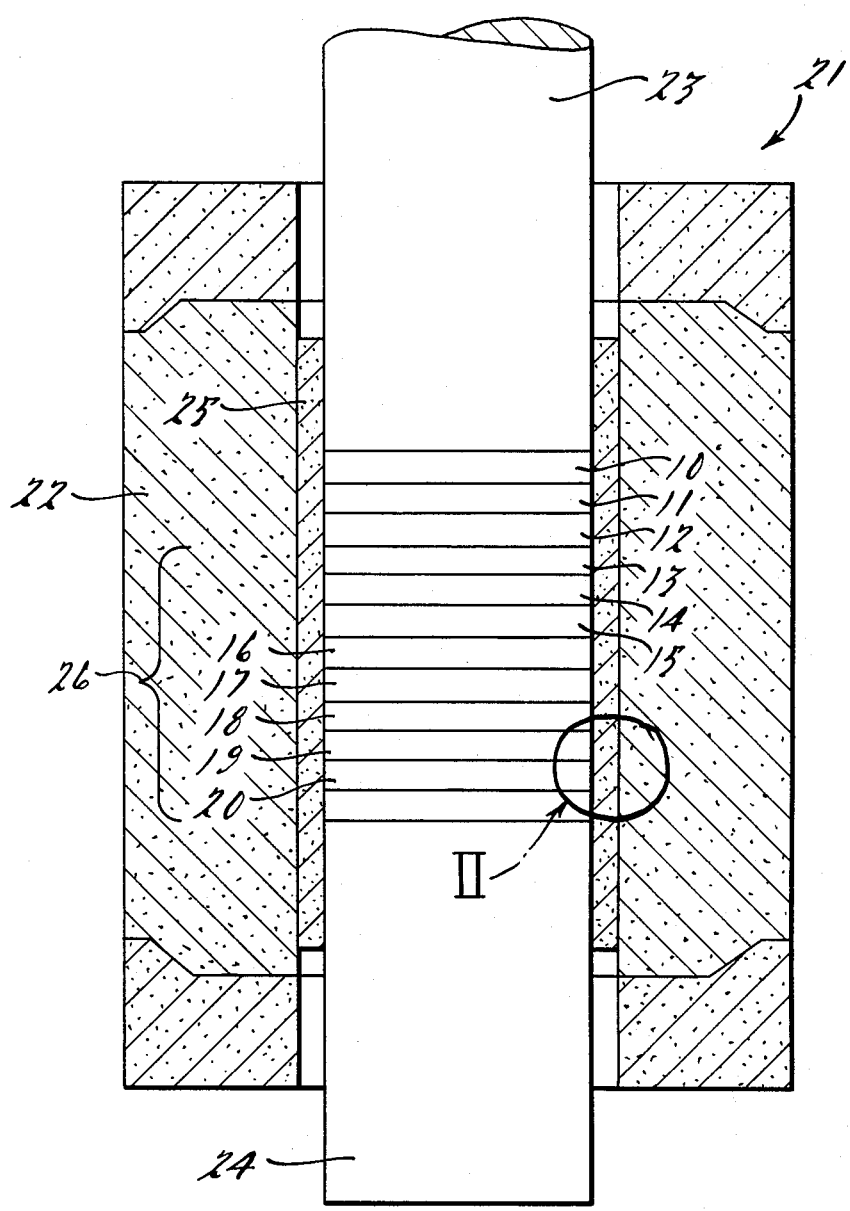
FIG. 1 is a schematic central sectional view of a pressing assembly embodying the principles of this invention.

A preferred mode for carrying out the above inventive method broadly involves (a) preparing a plurality of silicon nitride comprising billets, (b) stacking the billets and surrounding a predetermined zone of the stacked billets with a barrier wall, (c) inserting the stacked billets and barrier wall into a hot pressing assembly, and (d) effecting hot pressing. The billets are preferably prepared by mixing silicon powder and selected oxygen carrying ingredients, milling the mixture, cold compacting the mixture into a disc shaped billet, and nitriding the billet to form silicon nitride.

Forming Billets

Powdered silicon and reactive oxygen carrying agents and blended together and mixed. The reactive oxygen carrying powder agents are defined herein to mean powder ingredients that are effective to form second phase crystallites, particularly oxynitrides, and/or protective silicates when reacted with the silicon under a heated nitrogen atmosphere. The powder agents can be advantageously selected from the group consisting of $Y_2O_3$, $Al_2O_3$, $SiO_2$, $MgO$, $CeO_2$, $ZrO_2$, $HfO_2$, and other rare earths. Use of critical amounts of $Y_2O_3$ and $Al_2O_3$ will provide additional improvements, including formation of certain oxynitride phases which permit lower hot pressing temperatures as well as increased economy and the formation of critically small amounts of glassy silicates coating the crystallites or oxynitrides resulting from the nitriding.

For purposes of a preferred method, a uniform powder mixture is prepared with 2000 grams of silicon (86.6 weight percent of the mixture), 278 grams of $Y_2O_3$ (12 weight percent of the mixture and 13.9% of the silicon), and 32 grams $Al_2O_3$ (1.4 weight percent of mixture and 1.6% of silicon). The usable range for the oxygen carrying agents is 0.4–2.3 molar percent of the mixture and 0.42–2.40 molar percent of the silicon. $Y_2O_3$ is normally used in the range of 3–19% by weight of the silicon and 3.2–15.6% by weight of the mixture. The glass forming oxide, such as $Al_2O_3$, is used in the range of 0.4–5% by weight of the silicon, 0.4–4.0% by weight of the mixture. $SiO_2$ is usually present as an oxide on the silicon powder and increased to 1–3% by weight of the silicon after milling.

Each of the ingredients are selected to be relatively pure (at least 98% pure with Fe, Al, Mn, and Ca being the major trace contaminants in silicon) so as to minimize the introduction of impurities that will affect the ability of the silicon nitride to be properly hot pressed.

The mixture is comminuted and blended by being charged into an inert milling jar (polyethylene) along with grinding media in the form of Burundum cylinders (measured compounds include 85% $Al_2O_3$, 11% $SiO_2$, 2% $MgO$, 1.2% $CaO$) which may add $Al_2O_3$ to the mixture by attrition. The mixture is milled for 48 hours at 64 rpm, after which the mixture is separated from the media. The milling can be either dry or wet. The resulting dry milled mixture will have at least 50% with an average particle size of about 3 microns and 90% with a typical maximum particle size of 23 microns or less.

A measured quantity of the milled mixture is loaded into a cold press die arrangement and pressed at ambient conditions by use of 1400–1500 psi to form a disc shaped billet of a size about 6 inches by 0.6 inches, and a density of 1.4 grams per cubic centimeter.

The billet is then heated in a nitriding atmosphere without the use of pressure normally associated with hot pressing to produce a silicon nitride comprising body consisting of $Si_3N_4$, at least one dispersed second phase crystallite (silicon yttrium oxynitride), and up to 0.5% by weight of free silicon and unreacted oxygen carrying agents (here $Y_2O_3$). The billet will have a size greater than and a density less than the object to be formed by hot pressing.

To carry out the heating during nitriding the billet is placed in an enclosed furnace, preferably evacuated to a pressure of less than 1 micron, and heated at a fast rate to 1200° F. (649° C.). The furnace is then filled with a gaseous mixture consisting of 72% by weight nitrogen, 25% helium, and 3% hydrogen, and with the $H_2O$ and $O_2$ content in such gaseous mixture being less than 4 ppm. The temperature of the furnace is then increased to a nitriding temperature of 2000°–2600° F. (1093°–1427° C.) at a slower rate. Fresh nitrogen is intermittently supplied to the furnace to replace the nitrogen consumed in forming $Si_3N_4$ and oxynitrides.

The resulting nitrided body or billet will preferably consist of silicon nitride (at least 60% of which is in the alpha form), silicon yttrium oxynitride in the $Y_1SiO_2N$ phase, and up to 0.5% by weight of free silicon and/or unreacted $Y_2O_3$.

Alternatively, the silicon nitride comprising billets may be formed by mixing directly to silicon nitride powder the necessary additives such as $Y_2O_3$ and then cold pressing such mixture with a pressure of 1500 psi, and preliminarily heating such cold pressed preform to a temperature of about 1000° C. to nucleate the formation of secondary crystallites prior to hot pressing.

Stacking

The preformed billets 10–20 are then stacked within the hot pressing assembly 21 in a predetermined aligned order such as shown in FIG. 1. The pressing assembly preferably comprises a cylindrical, sleeve die body 25–22 and two end wall plungers or end members 23–24, at least one (23) of which is movable for purposes of applying pressure to the material within said assembly. The inner walls of the die bodies and end plungers are comprised of graphite. The graphite can be a molded grade, such as grade ATJ (made by Union Carbide), which is characterized by an extremely fine-grained texture, has high strength, and a relatively high density, but is expensive. Alternatively, a medium quality extruded graphite, such as grade HLM (made by Great Lakes Carbon Corp.) may be used, which is characterized by a medium grain size, lower strength and density, less expensive and can be machined to close tolerances with a good surface finish.

Interposing of Barrier Wall

Either prior to or subsequent to the stacking of said billets within said pressing assembly a nonporous reaction barrier wall (in the form of a cylinder 30) is interposed between a vertical zone 26 of said assembly in which the temperature of 1600°–1750° C. and a pressure of at least 1000 psi will be experienced during hot pressing by the billet material adjacent the graphite wall 25. The barrier wall must be effective to act as a chemical/physical barrier to the transport of gaseous reaction products therethrough. The barrier material physically prevents carbon monoxide from being transported therethrough and chemically prevents gaseous transport by acting as a "gettering" agent to react the available oxygen and thus avoid generation of CO. Either carbon monoxide or silicon monoxide can assume a gaseous phase under the high temperature and pressure conditions experienced at the interface of the billet and hot pressing walls. A reaction can take place between the silicon nitride of the billet and carbon monoxide (released as a result of the heat and oxygen content of the graphite pressing assembly) to form silicon carbide along with small quantities of free silicon and oxides of nitrogen (and/or free nitrogen and $CO_2$) as well as silicon monoxide.

$$Si_3N_4 + 2CO \rightarrow 2SiC + Si + 2N_2O$$

$$Si_3N_4 + 3CO \rightarrow 2SiC + 2N_2 + CO_2 + SiO$$

The silicon monoxide may also proceed to react with the graphite of the pressing assembly walls to form additional carbon monoxide and silicon carbide as a layer on the assembly walls. The conventional boron nitride slurry applied to a silicon nitride preform or billet, as a release agent, is unable to prevent transport of CO and/or SiO therethrough and thus is unable to prevent the undesirable reactions.

It has been discovered that a certain group of refractory metals will behave as physical/chemical barriers and preclude such undesirable reactions noted above. The group preferably consists of molybdenum, tantalum, tungsten, and niobium. The barrier material is advantageously applied as a layer in a thickness of 0.001–0.004 inch and in foil form to facilitate ease of placement and economy. However, the barrier material can be applied in sheet, powder, or other physical form, as long as it is planted as a barrier at the interface where temperature and pressure conditions are most sensitive.

Figure 2:
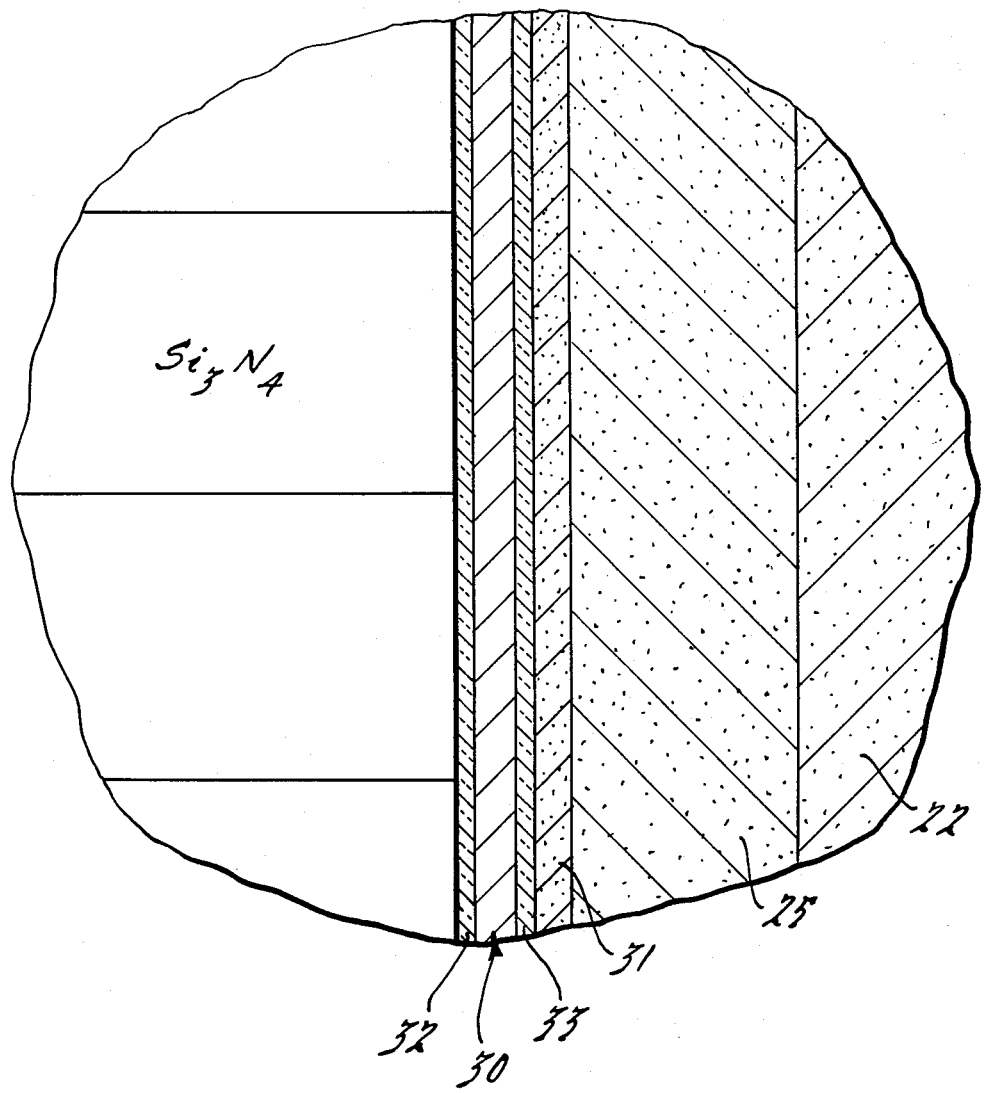
FIG. 2 is an enlarged view of a circled portion of FIG. 1.

As shown in FIG. 2, the graphite sleeve 25 may have lodged interior thereof a sleeve 31 of graphite foil and a sleeve 30 of the barrier material stationed immediately interior thereof. The barrier material may be coated with a release agent layer 32–33 of boron nitride on either side thereof.

Hot Pressing

The heating and pressing is carried out preferably in increments: (1) a mechanical loading of 100 psi is applied at room temperature to the body; (2) temperature is increased to 1800° F. (982° C.) and pressure increased to 500 psi; (3) temperature is then increased to 2500° F. (1371° C.) and pressure simultaneously increased to 2500 psi; (4) temperature is finally increased to the hot pressing temperature of 3000° F. (1649° C.) and pressure increased to 3700 psi, the latter conditions being maintained until at least 99% or desirably 99.9% of theoretical full density is achieved. This usually requires 0.25–3.0 hours (preferably 2 hours) at the hot pressing temperature (preferably at least 1600° C. The object is then cooled at any rate, even quenched, to room temperature.

The densified silicon nitride billets are easily pressed from the assemblage. The billets are characterized by no evidence of SiC.

The graphite components maintain their dimensional relationship, show no SiC formation, and are reusable for subsequent use.

We claim:

1. A method of hot pressing agglomerated $Si_3N_4$ comprising powdered materials in a pressing assembly having graphite walls the carbonaceous decomposition products of the walls reactive with the material to be pressed under the temperature and pressure conditions to be experienced at the interface between the material and reactive walls, comprising:

(a) forming a plurality of generally flat stackable billets of said powdered material;
(b) stacking said billets in said hot pressing assembly aligned with the direction of pressing;
(c) interposing a barrier wall between the interface of said billets with said pressing assembly and along at least a zone of said assembly in which a temperature of 1600°–1750° C. and a pressure of at least 1000 psi will be experienced at said interface during hot pressing, said barrier wall being effective to prevent a chemical and physical reaction between the $Si_3N_4$ of said billets and the decomposition products of said graphite walls of said pressing assembly; and
(d) hot pressing said billets within said assembly to achieve a desired density in each of said billets.

2. The method as in claim 1, in which said walls of said pressing assembly are comprised of graphite.

3. A method of hot pressing agglomerated powdered materials in a pressing assembly having graphite walls reactive with the material to be pressed under the temperature and pressure conditions to be experienced by the material and said walls in hot pressing, comprising:

(a) preparing a plurality of silicon nitride comprising billets, each having silicon nitride and oxygen carrying crystallites, and containing up to 0.5% by weight free silicon and unreacted oxides, and up to 0.2% by weight cation impurities, each billet having a density of at least 2.0 gm/cm³;
(b) stacking said billets in a predetermined aligned order within said pressing assembly;
(c) prior to or subsequent to the stacking of said billets in said assembly, interposing a solid barrier wall therebetween at a zone of said assembly in which a temperature of 1600°–1750° C. and a pressure of at least 1000 psi, as will be experienced during hot pressing, said barrier wall being effective to act as a mechanical barrier to the transport of carbonaceous gaseous reaction products of said graphite walls therethrough; and
(d) hot pressing said plurality of stacked billets to achieve a desired density in each of said billets and a composition consisting substantially of beta form silicon nitride.

4. The method as in claim 3, in which said graphite has a density of at least 1.68 gm/cm³ and a strength of at least 2400 psi (with the grain).

5. The method as in claim 3, in which said barrier wall is selected from the refractory metals group consisting of molybdenum, tungsten, tantalum, and niobium.

6. The method as in claim 3, in which prior to stacking said billets, the body of said barrier material is coated with a release agent prior to hot pressing.

7. The method as in claim 6, in which said release agent is comprised of boron nitride and applied as a slurry.

8. The method as in claim 5, in which said barrier wall has a thickness in the range of 0.001–0.004 inches.

9. The method as in claim 8, in which said barrier wall is placed as a cylindrical liner interposed between the side walls of said pressing assembly and the intermediate section of said stacked series of billets, said barrier wall being in contiguous contact with said side walls and sides of said billets.

10. The method as in claim 9, in which said assembly further includes the interposition of removable graphite foil along the outwardly facing surface of said barrier wall.

* * * * *